United States Patent [19]
Reid

[11] Patent Number: 5,154,821
[45] Date of Patent: Oct. 13, 1992

[54] POOL PUMP PRIMER

[76] Inventor: Ian R. Reid, 847 Belle Isle View, Windsor, Ontario, Canada, N9A 3G4

[21] Appl. No.: 793,558

[22] Filed: Nov. 18, 1991

[51] Int. Cl.⁵ .................................................. B01D 35/01
[52] U.S. Cl. .................... 210/169; 210/416.2; 4/490; 417/569; 137/566
[58] Field of Search .................. 210/169, 416.1, 416.2; 4/490; 417/569; 137/566

[56] References Cited

U.S. PATENT DOCUMENTS

| | | | |
|---|---|---|---|
| 525,556 | 9/1894 | Lawless | 417/571 |
| 868,192 | 10/1907 | La Vergne | 417/201 |
| 1,517,665 | 12/1924 | Chase | 417/250 |
| 1,528,253 | 3/1925 | Lanser | 417/251 |
| 1,704,776 | 3/1929 | Waitz | 417/569 |
| 1,736,486 | 11/1929 | Carnahan | 417/569 |
| 1,821,900 | 9/1931 | Silvers | 417/569 |
| 1,998,902 | 6/1933 | Mattich | 417/569 |
| 2,297,238 | 9/1942 | Neugebauer et al. | 417/425 |
| 2,575,508 | 11/1951 | Balletto | 417/569 |
| 2,814,992 | 12/1957 | Humason | 417/569 |
| 2,883,939 | 4/1959 | Russel | 417/569 |
| 2,966,861 | 1/1961 | Stewart et al. | 417/569 |
| 3,469,532 | 9/1969 | Wegmann et al. | 417/569 |
| 3,473,479 | 10/1969 | Sundholm | 417/569 |

Primary Examiner—Stanley S. Silverman
Assistant Examiner—Robert James Popovics
Attorney, Agent, or Firm—Reising, Ethington, Barnard, Perry & Milton

[57] ABSTRACT

A pool pump primer has an elongated housing that enables a user to prime a pool pump and the elongated housing has a distal end thereon defining an outlet from the primer and the primer has an inlet on one side thereof closely adjacent the outlet to be locatable below the water level in a skimmer chamber of a swimming pool. The pump has an imperforate piston stroked up and down by a piston rod for drawing fluid from the skimmer chamber through the inlet to fill the elongated housing during an upstroke and for discharging priming fluid from the tubular housing during a downstroke for flow thereof through the distal end into a water supply line connected to the pool pump for priming the pump.

6 Claims, 2 Drawing Sheets

POOL PUMP PRIMER

FIELD OF THE INVENTION

This invention relates to pool pumping systems for swimming pools and more particularly to pump primers for filling the pump cavity with liquid prior to circulating water from the pool for flow through a filtering media for removing particulates from the pool and cleaning the water within the pool.

BACKGROUND OF THE INVENTION

Swimming pool pumping systems have a circulating pump with an inlet connected by an inlet water line to a drain opening in a skimmer chamber. Such systems have an inlet filter upstream of the inlet to the circulating pump and further have a larger capacity filter downstream of the circulating pump for removing particulates from the pool water and if desired including media for conditioning the pool water. One problem with such systems is that water may be drained from the pump when the filters are cleaned or replaced or if the pump is stopped or turned off. When water is drained the pump it is necessary to fill the pump cavity with priming liquid so that the pump impeller can efficiently draw liquid from the skimmer chamber to refill all the filter cavities and the inlet and outlet pipes of the pumping system.

In the past, in order to prime such systems it has been necessary to liquid fill the pump filter housings at a location which exposes the repair person to electrical wiring and other operative components of the system. If the priming liquid spills, it can present a shock hazard or damage the system.

According to the present invention, a pool pump primer is provided to prime pool pumps, having closed all filter access hatches, without having to refill a pump filter and without having to open the filtering components or without splashing water in the vicinity of the pump or its electric drive motor, or if the pump has been stopped, without having to open the pump filter access to fill with priming liquid.

While various pump primers are known, as shown in U.S. Pat. Nos. 525,556; 868,192 and 1,528,253, none of the pumps are configured to provide a low cost, hand carried, portable pump that can be positioned to pump priming fluid into the inlet of a pump merely by inserting one end of the primer into a drain opening in a skimmer chamber and operating a valveless piston to draw priming liquid from the skimmer chamber for priming a pool water circulating pump.

U.S. Pat. No. 1,517,665 discloses the use of a separate hand pump that is used in association with the inlet water pipe to an engine cooling pump. However, in this case the connection to the separate hand pump is such that it will draw bilge water for discharge through the inlet water pipe directly to the sea. U.S. Pat. No. 2,297,238 discloses the use of a hand operated pump to prime a fuel system for a motor vehicle.

None of the aforesaid references provide a pool pump primer having features thereon that provide portability and quick connection to known pool skimmer components for priming a pump with liquid from the pool following cleaning and reconnection of the filtering components of a pool pumping system.

SUMMARY OF THE INVENTION

The present invention is a portable pump primer having an elongated housing that can be quickly manufactured at low cost and operable to provide a high capacity charge of priming fluid to be pumped to the inlet side of a pool pump after associated filters are cleaned and closed so as to prime the pool pump for preventing motor or impeller burnout during pool pumping system operation.

A feature of the present invention is to provide an elongated high capacity tubular housing and a valveless piston forming a variable volume pump chamber in a portable hand carried primer that includes a distal end on the tubular housing that defines an outlet from the variable volume pump chamber and that further includes an inlet for connection to the drain opening in a skimmer chamber for supplying priming liquid to a circulating pump of a pool pumping system through an inlet water pipe leading to the inlet eye of the circulating pump.

A still further feature of the present invention is to provide a low cost portable pool primer pump including an elongated high capacity tubular housing having a distal end adapted to be connected to the drain opening of a skimmer chamber and thereby to an inlet water line connected to the inlet of a circulating pump of a pool pumping system and wherein the tubular housing includes a side port therein located a predetermined distance from the distal end so as to remain covered with water contained within the skimmer chamber and which cannot be bypassed by the piston and wherein a one way water inlet valve is operatively associated with the side port and a one way water outlet valve is operatively associated with the distal end to selectively open and close communication between a pumping chamber within the tubular housing, the skimmer chamber and the inlet water line and including hand operated means for varying the volume of the pumping chamber to continuously draw liquid from the skimmer chamber into the circulating pump for priming the pump with liquid.

An object of the present invention is to provide a pool pumping system having an electric motor driven pump having an inlet connected to a pump for drawing water from a pool skimmer trough for flow through a skimmer drain into a water inlet line to a pump inlet filter and for discharging water through a pool filter and thence through a pool water return line and wherein a portable pool pump primer is provided to prime the electric motor driven pump having an easily manufactured low cost elongated tubular housing with an interior surface and a height that provides a sufficient pumping capacity and wherein a plunger rod is movable into and out of said tubular housing respectively through downstrokes and upstrokes of the plunger rod, the plunger rod having a first end located exteriorly of said tubular housing and a second end located interiorly of said tubular housing and a handle is connected to the first end of the plunger rod and a piston is connected to the second end of the plunger rod slidably sealingly engaging the inner surface of the tubular housing; the tubular housing has a distal end defining an outlet and a one way outlet valve located within the tubular housing is operable during the downstroke of the piston within the tubular housing to open and operable during the upstroke of the piston within the tubular housing to close; a one way inlet valve on the tubular housing is located with respect to the one way outlet valve a distance less than the normal operating height of liquid in a skimmer chamber so as to be flooded with pool water during pump priming; the one way inlet valve is operable during the downstroke of the piston (during the down-stroke, the piston does not bypass the inlet valve) within the tubular housing to close and operable during the upstroke of the piston within the tubular housing to open; the distal end covers the skimmer drain opening and the plunger rod is hand reciprocable with respect to the tubular housing for drawing fluid from the skimmer chamber into the interior of the elongated tubular housing during an upstroke of the plunger rod and for discharging fluid from the interior of the elongated tubular housing into the pool water return during the downstroke of the plunger rod without leakage through the one way outlet valve for filling the circulating pump inlet filter with water so as to prime the pump impeller following replacement and or repair of the pump filter or other components of the pool pumping system.

A further object is to provide a portable pool primer pump as set forth in the preceding object wherein the distal end is tapered to fit in the drain opening of a skimmer.

A still further object is to provide a portable pool primer pump as set forth in the preceding object wherein the piston is a valveless piston which is reciprocated by a piston rod having a handle connected at one end thereof to provide a variable volume pumping chamber first connected to the skimmer through the one way inlet valve and thereafter connected to the water inlet line to a circulating pump through the one way outlet valve.

Still another object of the present invention is to provide a portable pool primer pump as set forth in the preceding objects wherein the one way valves are caged ball elements having a free floating open position and a seat engaged position when pressurized liquid is directed thereagainst.

Yet another object of the present invention is to provide a portable pool pump primer for use in drawing fluid from a pool skimmer for discharge into the inlet eye of a pool pump for priming the pool pump following replacement of a filter wherein the primer has an elongated tubular housing with an interior surface and a piston forming a variable volume pumping chamber; and wherein the primer includes a plunger rod movable into and out of the tubular housing respectively through downstrokes and upstrokes of the plunger rod; the plunger rod having a first end located exteriorly of said tubular housing and a second end located interiorly of the tubular housing; a handle is connected to the first end of the plunger rod and a piston is connected to the second end of the plunger rod and the piston slidably sealingly engages the inner surface of the tubular housing; the elongated tubular housing has a distal end defining an outlet and an enclosure cap on the opposite end thereof includes a guide for the plunger rod during downstrokes and upstrokes; and wherein a one way outlet valve is located within the tubular housing in coaxial alignment with a distal end of the tubular housing operable during the downstroke of the piston within the tubular housing to open and operable during the upstroke of the piston within the tubular housing to close; a one way inlet valve also located on the tubular housing at a point above the one way outlet valve a distance less than the vertical height of the skimmer. The vertical height is defined as the height of the normal water level in the skimmer relative to the lowest point in the skimmer. The one way inlet valve is operable during the downstroke of the piston within the tubular housing to close (the piston having its lowest stroke position above the inlet valve so as not to bypass the inlet valve on the downstroke) and is operable during the upstroke of the piston within the tubular housing to open; the distal end is engageable with a skimmer drain opening and the plunger rod is reciprocable with respect to the tubular housing for drawing priming liquid from the skimmer into the interior of the elongated tubular housing during an upstroke of the plunger rod and for discharging fluid from the interior of the elongated tubular housing into the pool water return during the downstroke of the plunger rod without leakage through the one way outlet valve for filling a pump inlet filter with water so as to prime a pump impeller following replacement and or repair of the pump filter or other components of the pool pumping system or any other situation causing drainage of the circulation and filter system.

A further object is to provide a portable pool primer pump as set forth in the preceding object wherein the distal end is configured to fit in the drain opening of a skimmer.

A still further object is to provide a portable pool primer pump as set forth in the preceding object wherein the piston is a valveless piston which is reciprocated by a piston rod having a handle connected at one end thereof to provide a variable volume pumping chamber first connected to the skimmer through the one way inlet valve and thence through the water inlet line to a circulating pump through the one way outlet valve.

Still another object of the present invention is to provide a portable pool primer pump as set forth in the preceding objects wherein the one way valves are caged ball elements having a free floating open position and a seat engaged position when pressure liquid is directed thereagainst.

BRIEF DESCRIPTION OF THE DRAWINGS

The above and other advantages, features and apparent from the following description taken in conjunction with the accompanying drawings wherein like reference numerals refer to like parts and wherein.

DESCRIPTION OF THE INVENTION

Figure 1:
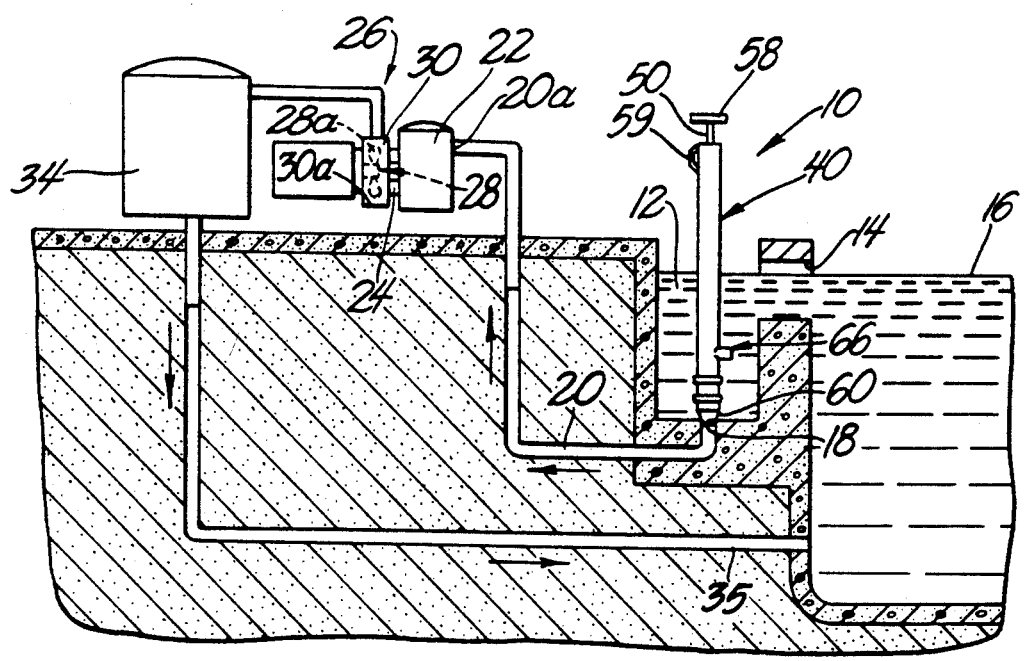
FIG. 1 is a diagrammatic view of a pool pumping system including the present invention.
Figure 2:
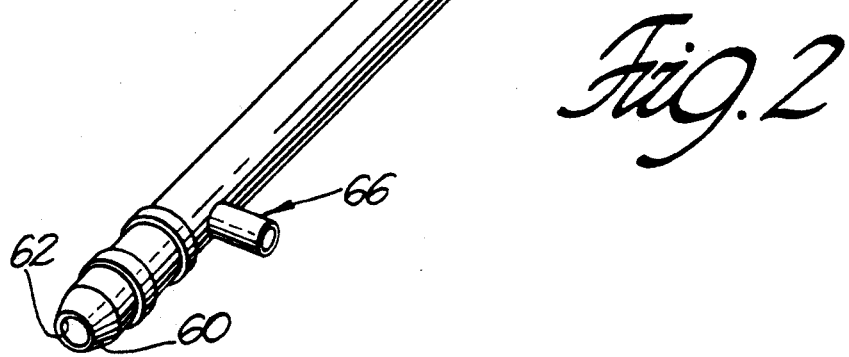
FIG. 2 is a perspective view of a portable pool pump primer in accordance with the present invention.

A pool pumping system 10 is illustrated in FIG. 1 as including a skimmer chamber 12 having an inlet opening 14 in communication with the pool water for skimming debris from the upper surface 16 thereof. The skimmer chamber 12 has a drain opening 18 connected to a water return line 20 having an outlet end 20a connected to the inlet of a pump filter 22. The pump filter 22 is connected to the inlet fitting 24 of a liquid pump 26.

The liquid pump 26 is of the type having an impeller 28 that is of the flexible type that has blades 28a thereon that wipe across the inner surface 30a of the pumping chamber 30. Such impellers have a tendency to leak across the individual blades thereof so as to have limited pumping efficiency as compared to more expensive positive displacement type pumps in which the impeller is located in a close precision relationship with the walls of the pumping chamber or in centrifugal pumps that have an expensive cast shrouded impeller. Because of the limited efficiency it is important that such pumps be properly primed before they are driven by an electric motor 32. In the absence of such priming the pump impeller can be destroyed by frictional wear between dry blades 28a and dry wall 30a thereby necessitating expensive repairs to the system. The problem with this type of pumping system is that the lack of an adequate prime is often not noticed until the impeller is damaged.

The pumping system further includes a pool filter 34 that must be cleaned periodically to assure proper conditioning of the pool water. The filter 34 is connected to the pool by a line 35. Each time that the pool filter is replaced or cleaned the pump filter is drained so as to remove the liquid prime in the casing of the liquid pump 26. In such cases it has been necessary to fill the pump filter 22 and in some cases an air pocket will remain causing the lack of prime with the resultant problems mentioned above. Another problem with such systems is that in order to fill the pump filter housing at the pump filter 22 it is necessary to expose electrical connections to the priming liquid with the possibility of electrical shock.

Figure 3:
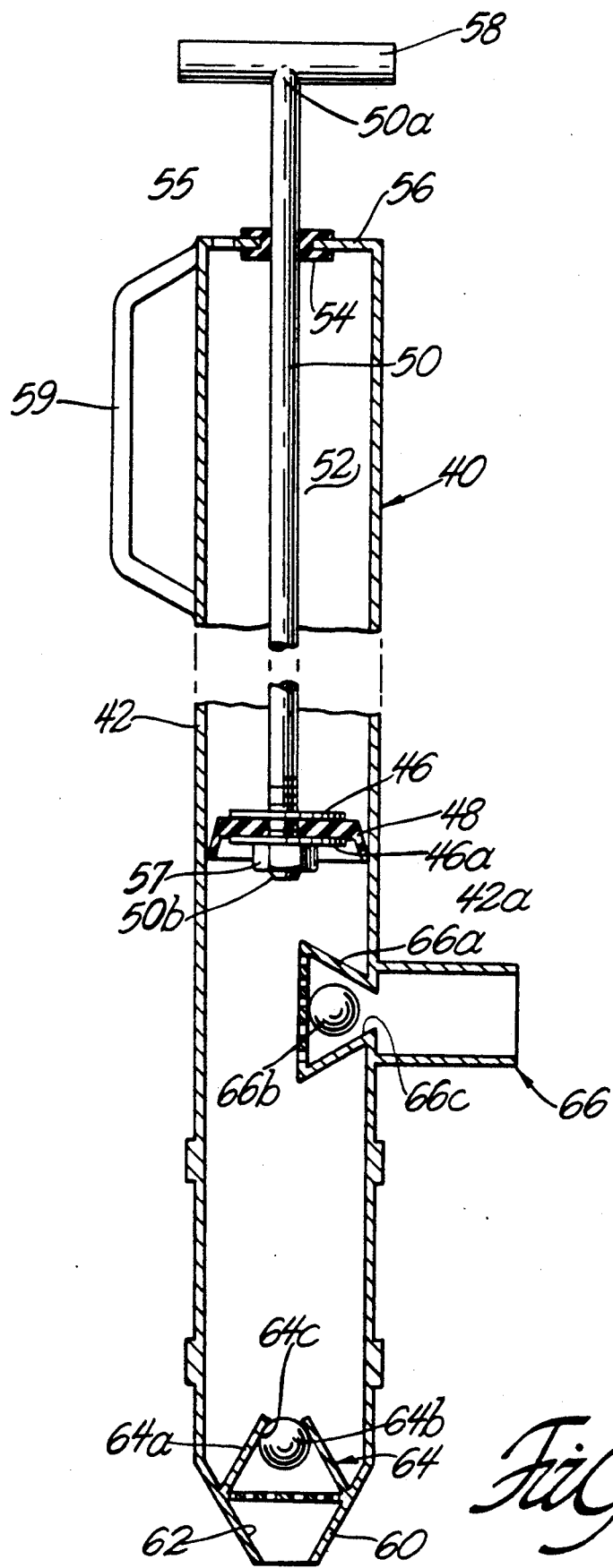
FIG. 3 is an enlarged longitudinal sectional view taken along the line 2—2 of FIG. 2 looking in the direction of the arrows.

In order to avoid a lack of prime or shock problems, the present invention includes a portable pool pump primer 40 having an elongated tubular housing 42 having a variable volume high capacity pump chamber 44 formed in part by an imperforate, valveless piston 46 having a peripheral seal 48 thereon slidably sealingly engaged with the inner surface 42a of the housing 42. As best show in FIG. 3, the tubular housing 42 includes a plunger rod 50 connected to the piston 46. The piston 46 is imperforate to seal a liquid side 46a thereof from an air space 52 located above the piston 46. The plunger rod 50 is directed through a guide bore 54 and pressure relief is provided by an air hole 55 both located in an end closure member 56 connected on the upper end of the tubular housing 42. A hand operated handle 58 is connected to an exterior end 50a of the plunger rod 50 and the interior end 50b of the plunger rod 50 is connected to the piston 46 by a nut 57 on the air side thereof.

The hand operated handle 58 is located to reciprocate the plunger rod 50 and the piston 46 connected thereto downwardly and upwardly within the tubular housing 42. If desired, a side handle 59 can be provided on the upper end of the tubular housing 42 for carrying the primer 40. The downstroke of the piston 46 is selected such that the piston 46 in its lowest position is located above an inlet valve to be described.

In accordance with one aspect of the present invention, the tubular housing 42 has a distal end 60 defining a tapered nose portion or outlet 62. A one way outlet valve 64 is located within the tubular housing 42 immediately above the outlet 62. It includes a cage 64a and a ball valve element 64b. When the piston 46 is pulled upwardly to expand the pump chamber 44, the ball valve element 64b is seated against a valve seat 64c on the cage 64a to prevent liquid drainage from the primer 40. The ball valve element 64b is opened during the downstroke of the piston 46 within the tubular housing 42 to allow discharge through the outlet 62. While a ball type check valve is illustrated, other valve types such as one-way lip seals or flap seals can be substituted in both the outlet valve 64 and a one-way inlet valve 66. The one way inlet valve 66 on the tubular housing 42 is located with respect to the one way outlet valve a distance less than the normal operating height of liquid in the skimmer chamber 12 so as to be flooded with pool water. The one way inlet valve 66 includes a cage 66a, a ball valve 66b and a valve seat 66c for controlling flow into the pump chamber 44. Specifically, the ball valve 66b is operable during the downstroke of the piston 46 within the tubular housing 42 to close against the seat 66c. The valve 66 is operable during the upstroke of the piston 46 within the tubular housing 42 to open.

In operation, the primer 40 is located such that the distal end 60 covers the skimmer drain opening 18 and the plunger rod is hand reciprocable with respect to the tubular housing for drawing fluid from the skimmer chamber 16 into the interior of the elongated tubular housing during an upstroke of the plunger rod 50 and for discharging fluid from the interior of the elongated tubular housing into the pool water return during the downstroke of the plunger rod without leakage through the one way outlet valve 64. This action causes the circulating pump filter 22 to be pumped full so as to prime the pump impeller following replacement and or repair of the pump filter or other components of the pool pumping system. In one working embodiment, the tubular housing 42 has a displacement of 360 cubic inches which displacement is sufficient to fill most pump filters and pump chambers with a minimum number of strokes to assure an adequate prime of the pump. Once the pump is primed the primer 40 can be stored away from the pool pumping system. The primer 40 is portable and can be used with existing systems without requiring extra plumbing fittings or fixed connections to establish the priming path from the pool water to the water inlet line thence to the pump itself. Further, when the primed pump begins to circulate pool water, even if the primer 40 is left in place in the skimmer inlet, the valve configuration is such that water will continue to circulate.

While I have shown a preferred embodiment of the present invention, it is understood that the same is not limited to the specific illustration herein but is susceptible of numerous changes and modifications as known to those skilled in the art. Further, I do not wish to be limited to the details shown and described herein, but I intend to cover all changes and modifications as are encompassed by the scope of the appended claims.

What is claimed is:

1. In a pool pumping system having an electric motor driven pump having an impeller and an inlet connected to a pump for drawing water from a pool skimmer for flow through a skimmer drain into a pump water return line to a pump inlet filter and for discharging water through a pool filter and thence into the pool the improvement comprising:

a pool skimmer having a vertical height and a skimmer drain opening;

a portable pool pump primer having a tubular housing having an interior surface;

a plunger rod movable into and out of said tubular housing respectively through downstrokes and upstrokes; said plunger rod having a first end located exteriorly of said tubular housing and a second end located interiorly of said tubular housing;

a handle connected to said first end of said plunger rod and an imperforate piston connected to said second end of said plunger rod; said imperforate piston slidably sealingly engaging the inner surface of said tubular housing;

said tubular housing having a tapered nose portion on one end thereof defining an outlet from said tubular housing and an enclosure cap on the opposite end thereof;

a one way outlet valve located within said tubular housing in coaxial alignment with said tapered nose portion operable during the downstroke of said piston within said tubular housing to open and operable during the upstroke of said piston within said tubular housing to close;

a one way inlet valve on said tubular housing at a point above said one way outlet valve a distance less than the vertical height of the skimmer; said one way inlet valve operable during the downstroke of said piston within said tubular housing to close and operable during the upstroke of said piston within said tubular housing to open;

said tapered nose engageable with the skimmer drain and said plunger rod reciprocable with respect to said tubular housing for drawing fluid from the skimmer into the interior of said tubular housing during an upstroke of the plunger rod and for discharging liquid from the interior of said tubular housing into the pump water return line during the downstroke of the plunger rod so as to prime the pump impeller following replacement and or repair of the pump filter of the pool pumping system.

2. In a pool pumping system having an electric motor driven pump having an impeller and an inlet connected to a pump for drawing water from a pool skimmer for flow through a skimmer drain into a pump water return line to a pump inlet filter and for discharging water through a pool filter and thence into the pool the improvement comprising:

a pool skimmer having a vertical height and a skimmer drain opening;

a portable pool pump primer having a tubular housing having an interior surface defining a variable volume pumping chamber;

a plunger rod movable into and out of said tubular housing respectively through downstrokes and upstrokes; said plunger rod having a first end located exteriorly of said tubular housing and a second end located interiorly of said tubular housing;

a handle connected to said first end of said plunger rod and an imperforate piston connected to said second end of said plunger rod; said imperforate piston slidably sealingly engaging the inner surface of said tubular housing;

said tubular housing having a nose portion on one end thereof defining an outlet from said housing and an enclosure cap on the opposite end thereof;

a one way outlet valve located within said tubular housing in coaxial alignment with said nose portion operable during the downstroke of said piston within said tubular housing to open and operable during the upstroke of said piston within said tubular housing to close;

a one way inlet valve on said tubular housing at a point above said one way outlet valve a distance less than the vertical height of the skimmer; said one way inlet valve operable during the downstroke of said piston within said tubular housing to close and operable during the upstroke of said piston within said tubular housing to open;

said nose portion engageable with the skimmer drain opening and said plunger rod reciprocable with respect to said tubular housing for drawing fluid from the skimmer into the interior of said tubular housing during an upstroke of the plunger rod and for discharging fluid from the interior of said tubular housing into the pump water return line during the downstroke of the plunger rod so as to prime the pump impeller following replacement and or repair of the pump filter of the pool pumping system.

3. A portable pool pump primer for use in drawing fluid from a pool skimmer for discharge into the inlet of a pool pump for priming the pool pump following replacement of a filter comprising in combination:

a pool skimmer having a vertical height and a skimmer drain opening;

a tubular housing with an interior surface and piston means defining a variable volume pumping chamber;

a plunger rod movable into and out of said tubular housing respectively through downstrokes and upstrokes of said plunger rod; said plunger rod having a first end located exteriorly of said tubular housing and a second end located interiorly of said tubular housing;

a handle connected to said first end of said plunger rod and said piston means connected to said second end of said plunger rod; said piston means slidably sealingly engaging the inner surface of said tubular housing;

said tubular housing having a distal end defining an outlet from said tubular housing; a cap no the opposite end thereof including an air hole and means for guiding said plunger rod during downstrokes and upstrokes;

a one way outlet valve located within said tubular housing in coaxial alignment with said distal end operable during the downstroke of said piston within said tubular housing to open and operable during the upstroke of said piston within said tubular housing to close;

a one way inlet valve on said tubular housing at a point above said one way outlet valve a distance less than the vertical height of the skimmer; said one way inlet valve operable during the downstroke of said piston within said tubular housing to close and operable during the upstroke of said piston within said tubular housing to open;

said distal end engageable with a skimmer drain opening and said plunger rod reciprocable with respect to said tubular housing for drawing fluid form the skimmer into the interior of said tubular housing during an upstroke of the plunger rod and for discharging fluid from the interior of said tubular housing into a pump water return line during the downstroke of the plunger rod.

4. A portable pool pump primer for use in drawing fluid from a pool skimmer for discharge into the inlet of a pool pump having a pump water return line for priming the pool pump comprising in combination:

a pool skimmer having a vertical height and a skimmer drain opening;

a tubular housing having an interior surface and a height in excess of the vertical distance between the skimmer drain opening and the inlet to the pool pump;

a plunger rod movable into and out of said tubular housing respectively through downstrokes and upstrokes of said plunger rod; said plunger rod having a first end located exteriorly of said tubular housing and a second end located interiorly of said tubular housing;

a handle connected to said first end of said plunger rod and a piston connected to said second end of said plunger rod slidably sealingly engaging the inner surface of said tubular housing;

said tubular housing having a tapered nose portion on one end thereof defining an outlet from said tubular housing and an enclosure cap on the opposite end thereof;

a one way outlet valve located within said tubular housing in coaxial alignment with said tapered nose portion operable during the downstroke of said piston within said tubular housing to open and operable during the upstroke of said piston within said tubular housing to close;

a one way inlet valve on said tubular housing at a point above said one way outlet valve a distance less than the vertical height of the skimmer; said one way inlet valve operable during the downstroke of said piston within said tubular housing to close and operable during the upstroke of said piston within said tubular housing to open;

said tapered nose engageable with the skimmer drain and said plunger rod reciprocable with respect to said tubular housing for drawing fluid from the skimmer into the interior of said tubular housing during an upstroke of the plunger rod and for discharging fluid from the interior of said tubular housing into the pump water return line to the pump during the downstroke of the plunger rod so as to prime the pump.

5. A portable pool pump primer for use in drawing fluid from a pool skimmer for discharge into the inlet of a pool pump having a pump water return line for priming the pool pump following replacement of a filter comprising in combination:

a pool skimmer having a vertical height and a skimmer drain opening;

an tubular housing with an interior surface and an imperforate piston having seal means thereon in engagement with said interior surface for defining a variable volume pumping chamber;

a plunger rod movable into and out of said tubular housing respectively through downstrokes and upstrokes of said plunger rod; said plunger rod having a first end located exteriorly of said tubular housing and a second end located interiorly of said tubular housing;

a handle connected to said first end of said plunger rod and said imperforate piston connected to said second end of said plunger rod;

said tubular housing having a distal end defining an outlet from said tubular housing; a cap on the opposite end thereof including means for guiding said plunger rod during downstrokes and upstrokes;

a one way outlet valve located within said tubular housing in coaxial alignment with said distal end operable during the downstroke of said piston within said tubular housing to open and operable during the upstroke of said piston within said tubular housing to close;

a one way inlet valve on said tubular housing at a point above said one way outlet valve a distance less than the vertical height of the skimmer; said one way inlet valve operable during the downstroke of said piston within said tubular housing to close and operable during the upstroke of said piston within said tubular housing to open;

said distal end engageable with a skimmer drain opening and said plunger rod reciprocable with respect to said tubular housing for drawing fluid from the skimmer into the interior of said tubular housing during an upstroke of the plunger rod and for discharging fluid form the interior of said tubular housing into the pump water return line to the pump during the downstroke of the plunger rod so as to prime the pump.

6. A portable pool pump primer for use in drawing fluid from a pool skimmer for discharge into the in let of a pool pump through a pump water return line for priming the pool pump comprising in combination:

a pool skimmer having a vertical height and a skimmer drain opening;

a tubular housing with an interior surface and an imperforate piston disc having seal means thereon in engagement with said interior surface for defining a variable volume pumping chamber;

a plunger rod movable into and out of said tubular housing respectively through downstrokes and upstrokes of said plunger rod; said plunger rod having a first end located exteriorly of said tubular housing and a second end located interiorly of said tubular housing;

a handle connected to said first end of said plunger rod and said piston disc connected to said second end of said plunger rod;

said tubular housing having a tapered nose portion on one end thereof defining an outlet from said tubular housing and a cap on the opposite end thereof;

a one way outlet valve located within said tubular housing in coaxial alignment with said tapered nose portion operable during the downstroke of said piston within said tubular housing to open and operable during the upstroke of said piston within said tubular housing to close;

a one way inlet valve on said tubular housing at a point above said one way outlet valve a distance less than the vertical height of the skimmer; said one way inlet valve operable during the downstroke of said piston within said tubular housing to close and operable during the upstroke of said piston within said tubular housing to open;

said tapered nose engageable with the skimmer drain opening and said plunger rod reciprocable with respect to said tubular housing for drawing fluid from the skimmer into the interior of said tubular housing during an upstroke of the plunger rod and for discharging fluid from the interior of said tubular housing into the pump water return line during the downstroke of the plunger rod so as to prime the pump.

* * * * *